US010078545B2

(12) United States Patent
Cancilla et al.

(10) Patent No.: US 10,078,545 B2
(45) Date of Patent: Sep. 18, 2018

(54) RESILIENT ANALYTICAL MODEL IN A DATA STREAMING APPLICATION

(71) Applicant: International Business Machines Corporation, Armonk, NY (US)

(72) Inventors: James E. Cancilla, Mississauga (CA); Samantha K. Chan, Toronto (CA); Mary M. L. Komor, Markham (CA)

(73) Assignee: International Business Machines Corporation, Armonk, NY (US)

( * ) Notice: Subject to any disclaimer, the term of this patent is extended or adjusted under 35 U.S.C. 154(b) by 94 days.

(21) Appl. No.: 15/175,070

(22) Filed: Jun. 7, 2016

(65) Prior Publication Data
US 2017/0351567 A1 Dec. 7, 2017

(51) Int. Cl.
*G06F 11/00* (2006.01)
*G06F 11/07* (2006.01)
(Continued)

(52) U.S. Cl.
CPC ........ *G06F 11/0793* (2013.01); *G06F 3/0604* (2013.01); *G06F 3/067* (2013.01);
(Continued)

(58) Field of Classification Search
CPC ...... G06F 3/0604; G06F 3/0657; G06F 3/067; G06F 11/0727; G06F 11/0793; G06F 17/30516; G06N 99/005
See application file for complete search history.

(56) References Cited

U.S. PATENT DOCUMENTS 8,949,801 B2   2/2015 Andrade et al.
2007/0260563 A1*  11/2007 Fan ..................... G06N 99/005
                                                          706/12
(Continued)

OTHER PUBLICATIONS

Chan, Samantha, "What's New in Streams v4.0.1", Jul. 3, 2015, IBM developerWorks/Developer Centers, Streamsdev, Grace Period Disclosure, <https://developer.ibm.com/streamsdev/2015/07/03/whats-new-in-streams-v4-0-1/>, 2 pages.
(Continued)

*Primary Examiner* — Joshua P Lottich
(74) *Attorney, Agent, or Firm* — Gilbert Harmon, Jr.

(57) ABSTRACT

An approach for restoring an analytical model in a data streaming application which involves creating a plurality of data buffers for holding data submitted to the data streaming application, wherein the data streaming application comprises a first analytical model, persisting one or more parameters and/or internal state variables associated with the first analytical model, persisting the plurality of data buffers, retrieving a plurality of persisted data buffers and the one or more parameters and/or internal state variables responsive to a failure of the data streaming application, creating a second analytical model associated with the data streaming application and initializing the second analytical model with the one or more parameters and/or more internal state variables, and submitting data, associated with the plurality of persisted data buffers, to the data streaming application for training the second analytical model to be a close approximation of the first analytical model.

20 Claims, 3 Drawing Sheets

(51) Int. Cl.
*G06F 3/06* (2006.01)
*G06N 99/00* (2010.01)

(52) U.S. Cl.
CPC ........ *G06F 3/0656* (2013.01); *G06F 11/0727* (2013.01); *G06N 99/005* (2013.01)

(56) References Cited

U.S. PATENT DOCUMENTS

| | | | | |
|---|---|---|---|---|
| 2008/0256167 | A1* | 10/2008 | Branson | G06F 9/5027 709/201 |
| 2010/0293532 | A1* | 11/2010 | Andrade | G06F 11/1438 717/140 |
| 2012/0297249 | A1* | 11/2012 | Yang | G06F 9/5072 714/19 |
| 2014/0304545 | A1 | 10/2014 | Chen et al. | |
| 2017/0083396 | A1* | 3/2017 | Bishop | G06F 11/0793 |
| 2017/0235796 | A1* | 8/2017 | Vali | G06F 17/30516 706/11 |

OTHER PUBLICATIONS

Jacques-Silva et al., "Modeling Stream Processing Applications for Dependability Evaluation", printed Feb. 19, 2016 978-1-4244-9233-6/11, © 2011 IEEE, pp. 430-441.
"Download IBM® InfoSphere® Streams Version 4.0.1", IBM, Reference #: 4040242, Modified date: Jul. 3, 2015, Grace Period Disclosure, <http://www-01.ibm.com/support/docview.wss?uid=swg24040242>, 4 pages.
"Guaranteed tuple processing in InfoSphere Streams v4 with consistent regions", IBM developerWorks / Developer Centers, GabrielaJS / Feb. 20, 2015, 7 pages.

* cited by examiner

RESILIENT ANALYTICAL MODEL IN A DATA STREAMING APPLICATION

STATEMENT REGARDING PRIOR DISCLOSURES BY THE INVENTOR OR A JOINT INVENTOR

The following disclosure(s) are submitted under 35 U.S.C. 102(b)(1)(A):

(i) [What's New in Streams v4.0.1, Samantha Chan, Jul. 3, 2015, https://developer.ibm.com/streamsdev/2015/07/03/whats-new-in-streams-v4-0-1/]; and (ii) [Download IBM InfoSphere Streams Version 4.0.1, Jul. 3, 2015, http://www-01.ibm.com/support/docview.wss?uid=swg24040242].

BACKGROUND

The present invention relates generally to the field of data analytics, and more particularly to analytical models in data streaming applications.

Data analytics refers to the processing and analysis of different types of data, e.g., structured, unstructured, etc., for the purpose of making conclusions and discovering insight about the information that the data represent. Data streaming applications, such as IBM Streams by International Business Machines Corporation, are software programs which can rapidly process incoming real time data, i.e., streaming data, from a variety of sources. Data streaming applications may comprise a plurality of operators (e.g., computer processes) which can analyze the incoming data for purposes such as forecasting future results, detecting anomalous patterns and/or filtering the data. A data type processed by data streaming applications can be, for example, tuples, which are generally ordered sets of values.

Some operators in data streaming applications comprise analytical models, e.g., machine-learning models, which are dynamically developed, i.e., trained, for accurately forecasting future results based on analyzed data. Analytical models in a data streaming application may comprise dynamic state variables which are adjusted based on incoming data that is analyzed and which determine how that data is forecasted.

SUMMARY

According to one embodiment of the present invention, a method for restoring an analytical model in a data streaming application is provided, the method comprises creating a plurality of data buffers for holding data submitted to the data streaming application, wherein the data streaming application comprises a first analytical model and the plurality of data buffers comprise an initialization buffer; persisting at least one of one or more parameters and one or more internal state variables associated with the first analytical model; persisting the plurality of data buffers; responsive to a failure of the data streaming application, retrieving the at least one of one or more parameters and one or more internal state variables; retrieving a plurality of persisted data buffers; creating a second analytical model associated with the data streaming application and initializing the second analytical model with the at least one of one or more parameters and one or more internal state variables; submitting initialization data, associated with a persisted initialization data buffer, to the data streaming application for training the second analytical model; and submitting remaining data, associated with one or more remaining persisted data buffers of the plurality of persisted data buffers, to the data streaming application for training the second analytical model, whereupon the second analytical model is a close approximation to the first analytical model prior to the failure of the data streaming application. A corresponding computer program product and computer system are also disclosed herein.

DETAILED DESCRIPTION

Embodiments of the present invention recognize that data streaming applications which ingest real time data need to be able to rapidly restore analytical models when recovering from application failures. Analytical models used by data streaming applications can be trained for forecasting future results based on a set of initialization data as well as incoming real time data. In order to resume accurately forecasting future results and avoid delays in output after an application failure, a data streaming application needs to have an analytical model in place which is similar to the analytical model in use before the failure occurred. Embodiments of the present invention therefore provide solutions enabling data streaming applications to quickly resume data processing with accurate results after application failures by establishing analytical models based on initialization data and streaming data received prior to the failures.

In describing embodiments in detail with reference to the figures, it should be noted that references in the specification to "an embodiment," "other embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, describing a particular feature, structure or characteristic in connection with an embodiment, one skilled in the art has the knowledge to affect such feature, structure or characteristic in connection with other embodiments whether or not explicitly described.

Figure 1:
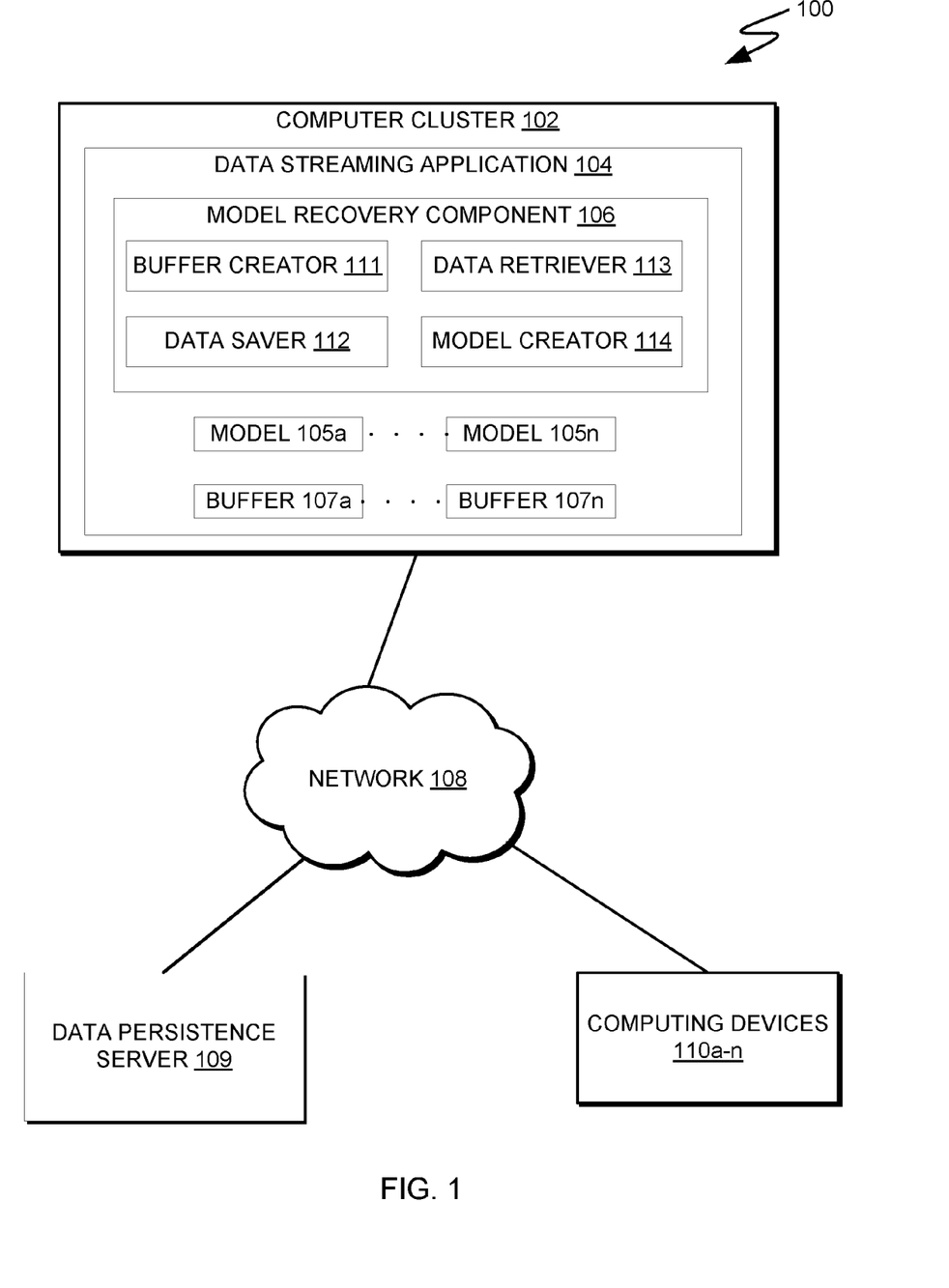
FIG. 1 is a functional block diagram illustrating a distributed data processing environment, in accordance with an embodiment of the present invention.

The present invention will now be described in detail with reference to the figures. FIG. 1 is a functional block diagram illustrating a distributed data processing environment 100, in accordance with an embodiment of the present invention. Distributed data processing environment 100 comprises computer cluster 102, data persistence server 109 and computing devices 110*a-n*, all interconnected over network 108.

Computer cluster 102 is generally representative of any number of computer systems which can be a laptop computers, tablet computers, netbook computers, personal computers (PC), desktop computers, or any programmable electronic device capable of communicating with computing devices 110*a-n* via network 108. Computer cluster 102 comprises data streaming application 104, which is a software program such as, but not limited to, IBM Streams, capable of processing streaming data in real time, e.g., data being sent from computing devices 110*a-n*. Computer systems comprising computer cluster 102 may include internal and external hardware components, as depicted and described in further detail with respect to FIG. 3.

Data streaming application 104 further comprises model recovery component 106, models 105*a-n*, buffers 107*a-n*, wherein models 105*a-n* and buffers 107*a-n* are respectively representative of any number of analytical models and data buffers. Model recovery component 106 is capable of restoring an analytical model, e.g., any of models 105*a-n*, in the event of an application failure. Model recovery component 106 comprises buffer creator 111, data saver 112, data retriever 113 and model creator 114. Buffer creator 111 can create a plurality of data buffers, e.g., buffers 107*a-n*, for storing data submitted to data streaming application 104 for model training and analysis.

Data saver 112 can persist created data buffers, as well as available parameters and/or internal state variables associated with an analytical model, on a predetermined basis. Model recovery component 106 can initiate an application recovery after a failure of data streaming application 104 and use data retriever 113 to retrieve the persisted data buffers, parameters and/or internal state variables. Model creator 114 can create a new analytical model in data streaming application 104 and submit data associated with the retrieved data buffers, as well as retrieved parameters and/or internal state variables, to the new analytical model for rapidly resuming a model state consistent with a state in use prior to the application failure.

In various embodiments of the present invention, data persistence server 109 and computing devices 110*a-n* can each respectively be a laptop computer, tablet computer, netbook computer, personal computer (PC), a desktop computer, a personal digital assistant (PDA), a smart phone, or any programmable electronic device capable of communicating with computer cluster 102 via network 108. Computing devices 110*a-n* are generally representative of any number of computing devices.

Network 108 can be, for example, a local area network (LAN), a wide area network (WAN) such as the Internet, or a combination of the two, and can include wired, wireless, or fiber optic connections. In general, network 108 can be any combination of connections and protocols that will support communications between computer cluster 102, data persistence server 109 and computing devices 110*a-n*. It should be noted that in some embodiments, data persistence server 109 can be included in computer cluster 102.

Figure 2:
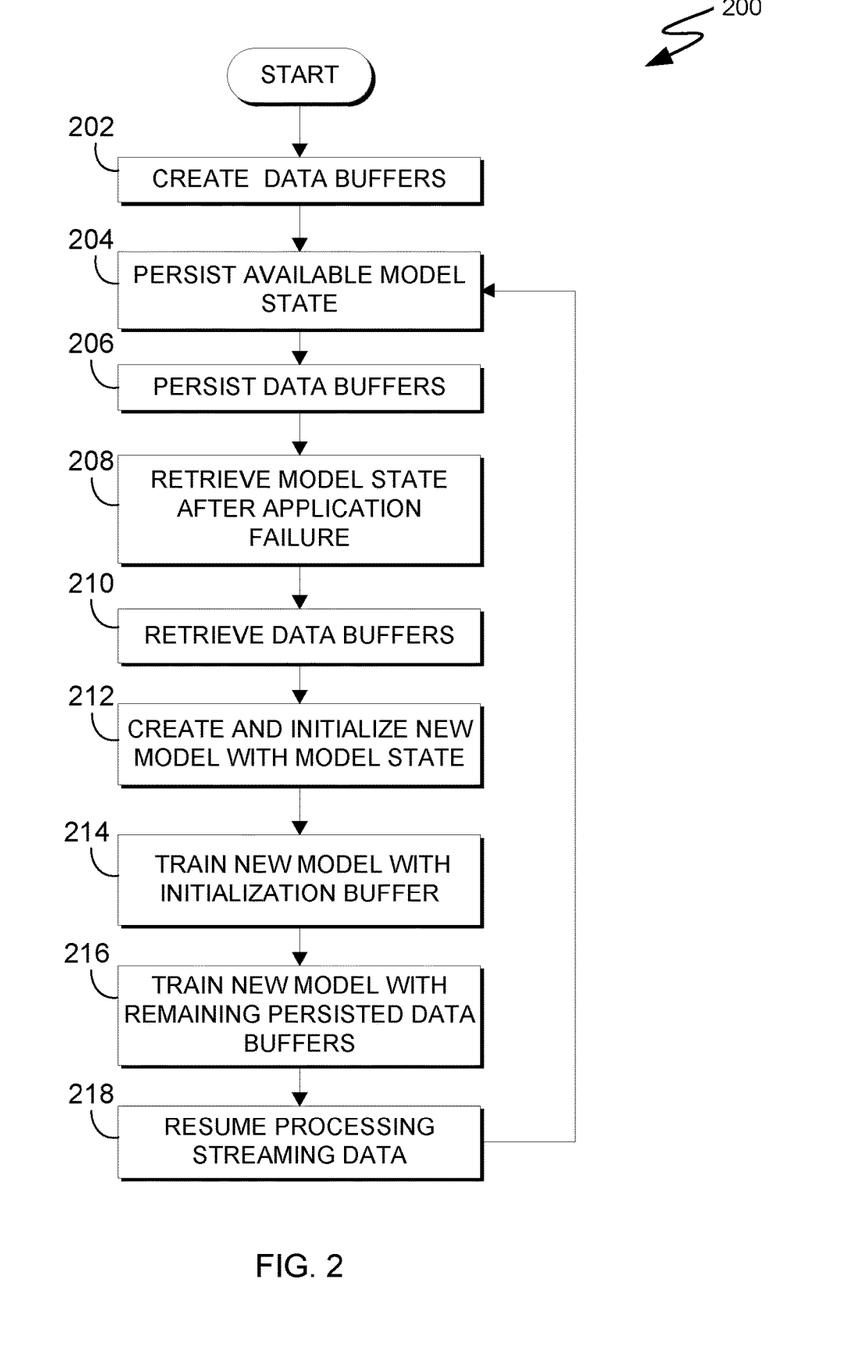
FIG. 2 is a flowchart depicting operational steps of a model recovery component on a computer system within the data processing environment of FIG. 1, in accordance with an embodiment of the present invention.

FIG. 2 is a flowchart 200 depicting operational steps of model recovery component 106, in accordance with an embodiment of the present invention. Buffer creator 111 creates, at step 202, one or more data buffers for storing data (e.g., tuples) which are processed by data streaming application 104. An initialization buffer can be created which holds data, such as, but not limited to, static initialization data, for initially training an analytical model. Static initialization data can refer to a predetermined set of preexisting data submitted to data streaming application 104 by a user. The size of the initialization buffer can be based on the amount of data, e.g., the number of tuples, used to initially train an analytical model, wherein the amount of data needed to initially train the analytical model can be one of a plurality of preconfigured parameters associated with the analytical model.

A sliding buffer can be created which holds a preconfigured amount of streaming data most recently processed by data streaming application 104, in the order that the data was received. The preconfigured maximum amount of data that can be stored in the sliding buffer can be, for example, equal to or greater than the amount of initialization data used to initially train the analytical model. If the sliding buffer is approaching the preconfigured maximum amount of data that it can hold, the earliest held data can be removed to create space for the newest streaming data that is being pushed to the sliding buffer.

In some embodiments, analytical models may store historical data comprising data (e.g., tuples) that has been analyzed by the model, in which case the maximum amount of historical data stored by an analytical model can be another preconfigured parameter associated with the analytical model, e.g., a multiple of the number of tuples needed to initially train the analytical model. For example, when static initialization data is first analyzed by an analytical model, the static initialization data will be stored as historical data and streaming data that is processed will also be stored as historical data, up to the maximum amount that can be held. When an analytical model is approaching the maximum amount of historical data it can hold, the earliest held historical data (e.g., the static initialization data) can be removed to create space for the newest incoming data.

Data saver 112 persists, at step 204, an analytical model state by persisting one or more parameters and/or internal state variables associated with the analytical model (comprising data streaming application 104) on a predetermined basis. The one or more parameters can comprise the previously described preconfigured parameters, e.g., an amount of data needed to initially train a model and an amount of historical data stored by a model, as well as any other parameters associated with an analytical model. Data saver 112 can retrieve parameters and/or internal state variables for persisting that are accessible by standard techniques, e.g., through application programming interfaces (APIs), when those parameters and/or internal state variables are available. The one or more parameters and/or internal state variables can be persisted on data persistence server 109.

Data saver 112 persists, at step 206, the created data buffers associated with an analytical model, on a predetermined basis. Model recovery component 106 can be configured to use application programming interfaces (APIs) (not shown) provided by data streaming application 104 to store current versions of any created data buffers comprising data tuples. According to an embodiment, data buffers can be stored on data persistence server 109, connected to data streaming application 104 via network 108.

Responsive to a failure of data streaming application 104, model recovery component 106 can initiate an application recovery and use data retriever 113 to retrieve, at step 208, an analytical model state by retrieving any persisted parameters and/or internal state variables associated with the analytical model of data streaming application 104. The persisted parameters and/or internal state variables can be retrieved by data retriever 113 from data persistence server 109. Data retriever 113 also retrieves, at step 210, any persisted data buffers, associated with the analytical model, from data persistence server 109.

Model creator 114 creates, at step 212, a new analytical model in data streaming application 104, using retrieved parameters and/or internal state variable values (retrieved from data persistence server 109) to initialize the new model, wherein the retrieved parameters and/or internal state variables are associated with an analytical model in use prior to the application failure, i.e., a first analytical model. The parameters used to initialize the new analytical model, i.e., a second analytical model, can comprise, but are not limited to, the previously described preconfigured parameters.

Model recovery component 106 trains the new analytical model, at step 214, with initialization data, associated with a retrieved initialization buffer, by submitting the initialization data to data streaming application 104 for analysis. The new analytical model is trained with the initialization data, e.g., static initialization data, to create a state of the new model that is consistent with a state of a prior analytical model, i.e., the first analytical model, when it was initially trained with the initialization data.

The new analytical model is trained, at step 216, with data from any remaining data buffers that were retrieved from data persistence server 109, wherein the data is associated with the first analytical model. Model recovery component 106 submits data in the retrieved remaining buffers (e.g., a retrieved sliding buffer) to data streaming application 104 for analysis and in doing so, trains the new analytical model with data previously analyzed by the prior analytical model, making the new analytical model a close approximation of the prior. For example, the state of the new analytical model can be a close approximation of the state of the prior analytical model at the time of a most recent data persistence.

It should be noted that any forecasted data which is output by the new analytical model, based on data from the retrieved data buffers which was previously analyzed by the prior analytical model, can be discarded by model recovery component 106 since that data has already been analyzed and used by the prior analytical model for data forecasting.

The new analytical model resumes processing streaming data at step 218, wherein streaming data can continue to be pushed to a retrieved sliding buffer. Forecasted data is subsequently output from the new analytical model, wherein the new analytical model state is a close approximation to the prior analytical model state, thus forecasting future results with similar accuracy. For example, the new analytical model can be created by model recovery component 106 to forecast data similarly to the prior analytical model, i.e., to be a close approximation, at least within a predetermined threshold percentage, e.g., 90%, 95%, etc. It should also be noted that how closely the new analytical model approximates to the prior analytical model can be based on the size of a persisted sliding buffer and how much recently analyzed streaming data it can hold.

It should be further noted that a new analytical model and a prior analytical model can both make use of the same algorithmic functions, i.e., they can operate mathematically identically, and may only differ in terms of output forecasted data, being that output data is based on data which the models receive as input which are used to dynamically adjust one or more internal state variables which the algorithmic functions comprise.

Figure 3:
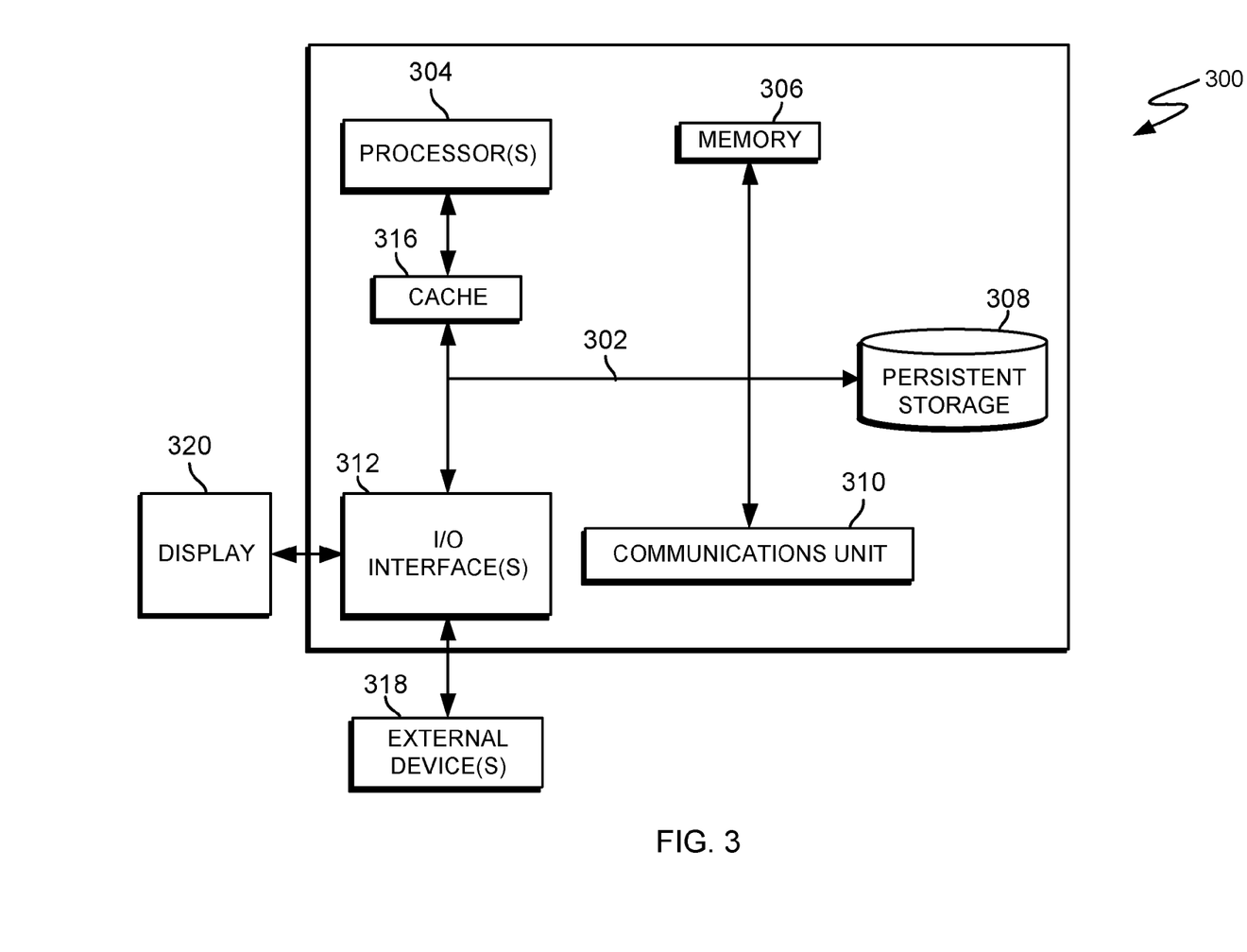
FIG. 3 is a block diagram of components of the computer system executing the model recovery component, in accordance with an embodiment of the present invention.

FIG. 3 depicts a block diagram 300 of components of computer cluster 102 in accordance with an illustrative embodiment of the present invention. It should be appreciated that FIG. 3 provides only an illustration of one implementation and does not imply any limitations with regard to the environments in which different embodiments may be implemented. Many modifications to the depicted environment may be made.

Computer cluster 102 includes communications fabric 302, which provides communications between cache 316, memory 306, persistent storage 308, communications unit 310, and input/output (I/O) interface(s) 312. Communications fabric 302 can be implemented with any architecture designed for passing data and/or control information between processors (such as microprocessors, communications and network processors, etc.), system memory, peripheral devices, and any other hardware components within a system. For example, communications fabric 302 can be implemented with one or more buses or a crossbar switch.

Memory 306 and persistent storage 308 are computer readable storage media. In this embodiment, memory 306 includes random access memory (RAM). In general, memory 306 can include any suitable volatile or non-volatile computer readable storage media. Cache 316 is a fast memory that enhances the performance of computer processor(s) 304 by holding recently accessed data, and data near accessed data, from memory 306.

Data streaming application 104, comprising model recovery component 106, can be stored in persistent storage 308 and in memory 306 for execution by one or more of the respective computer processors 304 via cache 316. In an embodiment, persistent storage 308 includes a magnetic hard disk drive. Alternatively, or in addition to a magnetic hard disk drive, persistent storage 308 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 308 can also be removable. For example, a removable hard drive can be used for persistent storage 308. Other examples include optical and magnetic disks, thumb drives, and smart cards that are inserted into a drive for transfer onto another computer readable storage medium that is also part of persistent storage 308.

Communications unit 310, in these examples, provides for communications with other data processing systems or devices. In these examples, communications unit 310 includes one or more network interface cards. Communications unit 310 can provide communications through the use of either or both physical and wireless communications links. Data streaming application 104 and model recovery component 106 can be downloaded to persistent storage 308 through communications unit 310.

I/O interface(s) 312 allows for input and output of data with other devices that can be connected to computer cluster 102. For example, I/O interface 312 can provide a connection to external devices 318 such as a keyboard, keypad, a touch screen, and/or some other suitable input device. External devices 318 can also include portable computer readable storage media such as, for example, thumb drives, portable optical or magnetic disks, and memory cards. Software and data used to practice embodiments of the present invention, e.g., data streaming application 104 and model recovery component 106, can be stored on such portable computer readable storage media and can be loaded onto persistent storage 308 via I/O interface(s) 312. I/O interface(s) 312 also connect to a display 320.

Display 320 provides a mechanism to display data to a user and can be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention can be a system, a method, and/or a computer program product at any possible technical detail level of integration. The computer program product can include a computer readable storage medium (or media)

having computer readable program instructions thereon for causing a processor to carry out aspects of the present invention.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention can be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block can occur out of the order noted in the figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for restoring an analytical model in a real-time data streaming application, the method comprising:
  creating a plurality of data buffers for holding real-time data submitted to the data streaming application, wherein the data streaming application comprises a first analytical model and the plurality of data buffers comprise an initialization buffer;
  persisting at least one of one or more parameters and one or more internal state variables associated with the first analytical model to a data persistence server connected by a network;
  persisting the plurality of data buffers to the data persistence server;
  responsive to a failure of the data streaming application, retrieving the at least one of one or more parameters and one or more internal state variables from the data persistence server;
  retrieving a plurality of persisted data buffers from the data persistence server;
  creating a second analytical model associated with the data streaming application and initializing the second analytical model with the at least one of one or more parameters and one or more internal state variables;
  submitting initialization data, associated with a persisted initialization data buffer, to the data streaming application for training the second analytical model; and
  submitting remaining data, associated with one or more remaining persisted data buffers of the plurality of persisted data buffers, to the data streaming application for training the second analytical model, whereupon the second analytical model is a close approximation to the first analytical model prior to the failure of the data streaming application.

2. The method of claim 1, wherein the plurality of data buffers further comprise a sliding buffer for holding recently analyzed streaming data.

3. The method of claim 1, wherein the first analytical model and the second analytical model are trained with submitted data for data forecasting.

4. The method of claim 1, wherein the initialization buffer holds data initially submitted to the first analytical model for training.

5. The method of claim 1, wherein the remaining data comprises data associated with a persisted sliding buffer of the one or more remaining persisted data buffers.

6. The method of claim 1, wherein the one or more parameters comprise one or more preconfigured parameters comprising at least one of an amount of data needed for an initial model training and an amount of analyzed data which is stored as historical data.

7. The method of claim 1, wherein the plurality of data buffers and the at least one of one or more parameters and one or more internal state variables are persisted on a data persistence server.

8. A computer program product for restoring an analytical model in a real-time data streaming application, the computer program product comprising:
  one or more non-transitory computer readable storage media and program instructions stored on the one or more non-transitory computer readable storage media, the program instructions comprising:
    program instructions to create a plurality of data buffers for holding real-time data submitted to the data streaming application, wherein the data streaming application comprises a first analytical model and the plurality of data buffers comprise an initialization buffer;
    program instructions to persist at least one of one or more parameters and one or more internal state variables associated with the first analytical model to a data persistence server connected by a network;
    program instructions to persist the plurality of data buffers to the data persistence server;
    program instructions to, responsive to a failure of the data streaming application, retrieve the at least one of one or more parameters and one or more internal state variables from the data persistence server;
    program instructions to retrieve a plurality of persisted data buffers from the data persistence server;
    program instructions to create a second analytical model associated with the data streaming application and initialize the second analytical model with the at least one of one or more parameters and one or more internal state variables;
    program instructions to submit initialization data, associated with a persisted initialization data buffer, to the data streaming application for training the second analytical model; and
    program instructions to submit remaining data, associated with one or more remaining persisted data buffers of the plurality of persisted data buffers, to the data streaming application for training the second analytical model, whereupon the second analytical model is a close approximation to the first analytical model prior to the failure of the data streaming application.

9. The computer program product of claim 8, wherein the plurality of data buffers further comprise a sliding buffer for holding recently analyzed streaming data.

10. The computer program product of claim 8, wherein the first analytical model and the second analytical model are trained with submitted data for data forecasting.

11. The computer program product of claim 8, wherein the initialization buffer holds data initially submitted to the first analytical model for training.

12. The computer program product of claim 8, wherein the remaining data comprises data associated with a persisted sliding buffer of the one or more remaining persisted data buffers.

13. The computer program product of claim 8, wherein the one or more parameters comprise one or more preconfigured parameters comprising at least one of an amount of data needed for an initial model training and an amount of analyzed data which is stored as historical data.

14. The computer program product of claim 8, wherein the plurality of data buffers and the at least one of one or more parameters and one or more internal state variables are persisted on a data persistence server.

15. A computer system for restoring an analytical model in a real-time data streaming application, the computer system comprising:
  one or more computer processors;
  one or more computer readable storage media;
    program instructions stored on the one or more computer readable storage media for execution by at least one of the one or more processors, the program instructions comprising:

program instructions to create a plurality of data buffers for holding real-time data submitted to the data streaming application, wherein the data streaming application comprises a first analytical model and the plurality of data buffers comprise an initialization buffer;

program instructions to persist at least one of one or more parameters and one or more internal state variables associated with the first analytical model to a data persistence server connected by a network;

program instructions to persist the plurality of data buffers to the data persistence server;

program instructions to, responsive to a failure of the data streaming application, retrieve the at least one of one or more parameters and one or more internal state variables from the data persistence server;

program instructions to retrieve a plurality of persisted data buffers from the data persistence server;

program instructions to create a second analytical model associated with the data streaming application and initialize the second analytical model with the at least one of one or more parameters and one or more internal state variables;

program instructions to submit initialization data, associated with a persisted initialization data buffer, to the data streaming application for training the second analytical model; and program instructions to submit remaining data, associated with one or more remaining persisted data buffers of the plurality of persisted data buffers, to the data streaming application for training the second analytical model, whereupon the second analytical model is a close approximation to the first analytical model prior to the failure of the data streaming application.

16. The computer system of claim 15, wherein the plurality of data buffers further comprise a sliding buffer for holding recently analyzed streaming data.

17. The computer system of claim 15, wherein the first analytical model and the second analytical model are trained with submitted data for data forecasting.

18. The computer system of claim 15, wherein the initialization buffer holds data initially submitted to the first analytical model for training.

19. The computer system of claim 15, wherein the remaining data comprises data associated with a persisted sliding buffer of the one or more remaining persisted data buffers.

20. The computer system of claim 15, wherein the one or more parameters comprise one or more preconfigured parameters comprising at least one of an amount of data needed for an initial training and an amount of analyzed data which is stored as historical data.

* * * * *